US008732481B2

(12) United States Patent
Balinsky et al.

(10) Patent No.: US 8,732,481 B2
(45) Date of Patent: May 20, 2014

(54) OBJECT WITH IDENTITY BASED ENCRYPTION

(75) Inventors: Helen Y. Balinsky, Cardiff Wales (GB); Liqun Chen, Bristol (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 13/361,850

(22) Filed: Jan. 30, 2012

(65) Prior Publication Data

US 2013/0198524 A1 Aug. 1, 2013

(51) Int. Cl.
*G06F 12/14* (2006.01)
*H04L 9/00* (2006.01)

(52) U.S. Cl.
USPC .......... 713/189; 705/50

(58) Field of Classification Search
USPC .......... 713/189; 380/282; 705/50
See application file for complete search history.

(56) References Cited

U.S. PATENT DOCUMENTS 7,581,176 B2 8/2009 Wilson
7,921,450 B1 4/2011 Vainstein et al.
2002/0188638 A1* 12/2002 Hamscher .......... 707/530
2003/0198348 A1* 10/2003 Mont et al. .......... 380/277
2003/0217264 A1* 11/2003 Martin et al. .......... 713/156
2007/0271459 A1 11/2007 Gomez
2008/0005024 A1* 1/2008 Kirkwood .......... 705/50
2010/0287377 A1 11/2010 Lim
2011/0066863 A1* 3/2011 Katzenbeisser et al. .......... 713/189
2012/0089841 A1* 4/2012 Boyer et al. .......... 713/175
2012/0185759 A1* 7/2012 Balinsky et al. .......... 715/209
2012/0260096 A1* 10/2012 Balinsky et al. .......... 713/176
2012/0303968 A1* 11/2012 Balinsky et al. .......... 713/189
2013/0031366 A1* 1/2013 Simske et al. .......... 713/168
2013/0073858 A1* 3/2013 Lim .......... 713/176

OTHER PUBLICATIONS

Lecarpentier, et al., Multilingual Composite Document Management Framework for the Internet: An FRBR Approach, DocEng2010, Sep. 21-24, 2010, Manchester, UK, 4 pgs.

* cited by examiner

*Primary Examiner* — Matthew Smithers

(57) ABSTRACT

A workflow order is created for the object. Public parameters are received from a key generation center at a computer associated with an object master. A public key is generated at the computer system based on a user identifier and the public parameters, wherein the user identifier is comprised of user related information. The object is encrypted using the public key such that the object cannot be opened without the a private key, wherein the object is a composite document comprising multiple elements of documents of different formats, and wherein the private key is generated in response to a request from an authenticated user using the user identifier at the key generation center. Access to the multiple elements of the object is controlled based on workflow order.

20 Claims, 4 Drawing Sheets

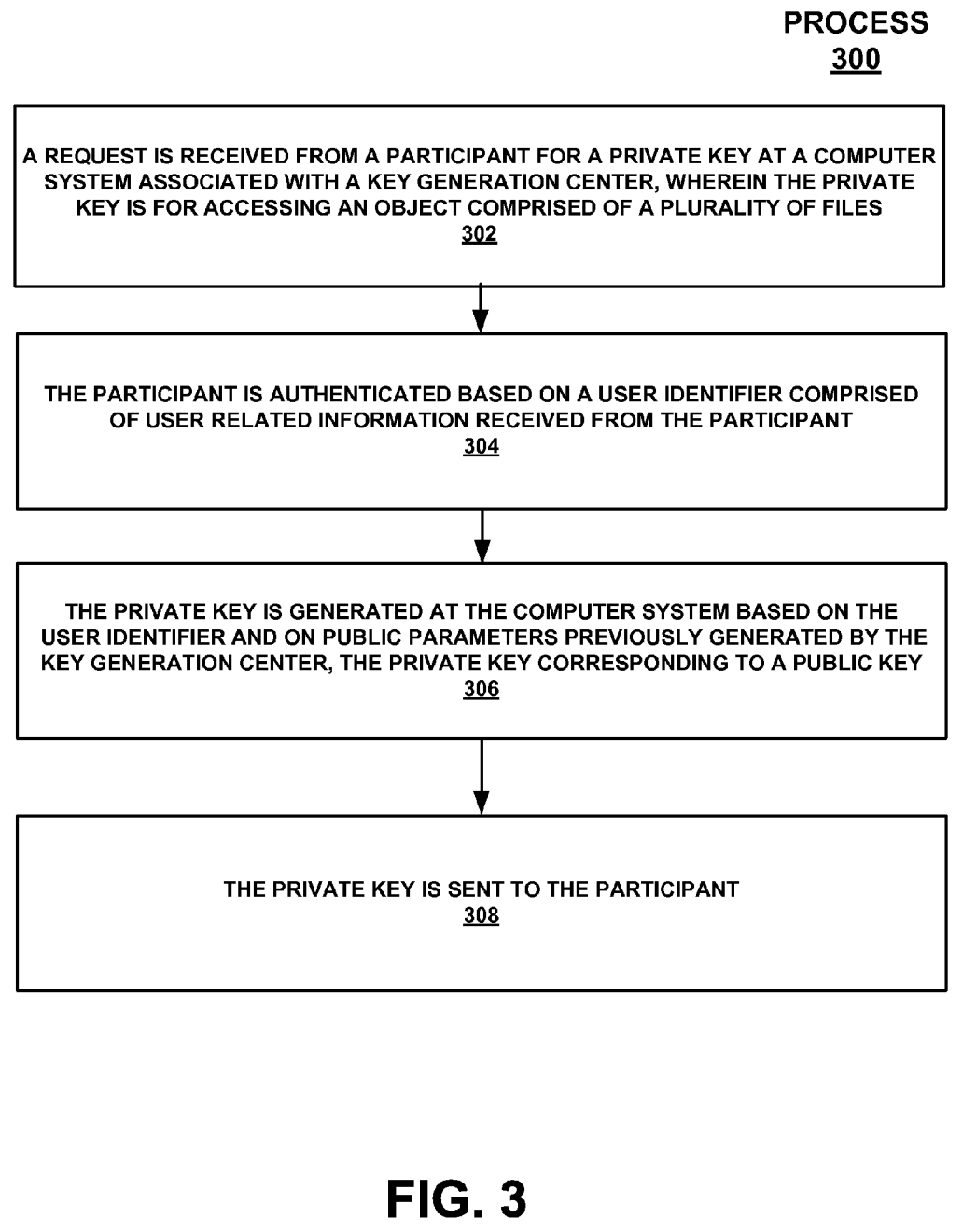

PROCESS
300

A REQUEST IS RECEIVED FROM A PARTICIPANT FOR A PRIVATE KEY AT A COMPUTER SYSTEM ASSOCIATED WITH A KEY GENERATION CENTER, WHEREIN THE PRIVATE KEY IS FOR ACCESSING AN OBJECT COMPRISED OF A PLURALITY OF FILES
302

THE PARTICIPANT IS AUTHENTICATED BASED ON A USER IDENTIFIER COMPRISED OF USER RELATED INFORMATION RECEIVED FROM THE PARTICIPANT
304

THE PRIVATE KEY IS GENERATED AT THE COMPUTER SYSTEM BASED ON THE USER IDENTIFIER AND ON PUBLIC PARAMETERS PREVIOUSLY GENERATED BY THE KEY GENERATION CENTER, THE PRIVATE KEY CORRESPONDING TO A PUBLIC KEY
306

THE PRIVATE KEY IS SENT TO THE PARTICIPANT
308

FIG. 3

OBJECT WITH IDENTITY BASED ENCRYPTION

BACKGROUND

Over the last decade, business document complexity has increased dramatically. New generation documents have grown from a single, monolithic file into complex bundles composed of differently-formatted files and file fragments inter-connected and logically linked. Through coherent styles, references, inclusions, and various navigation means, these web-portal-like composites are still presented to end users as single coherent and monolithic documents.

BRIEF DESCRIPTION OF THE DRAWINGS

FIG. 3 illustrates a flowchart of an example method for generating a private key for an encrypted object in accordance with examples of the present technology.

Figure 1:
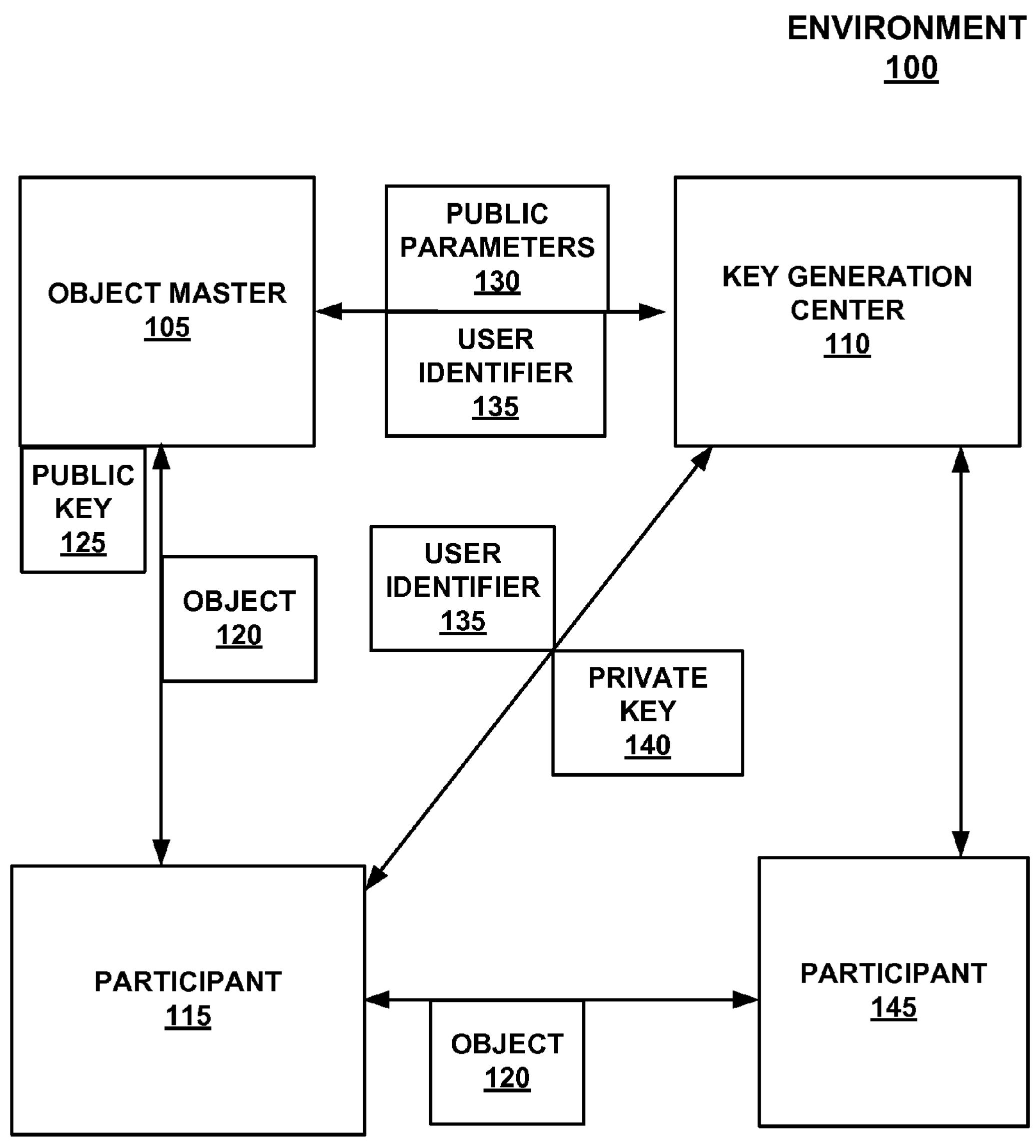
FIG. 1 illustrates a block diagram of an example environment for encrypting and accessing an object with identity based encryption in accordance with examples of the present technology.

The drawings referred to in this description of examples should be understood as not being drawn to scale except if specifically noted.

DESCRIPTION OF EMBODIMENTS

Reference will now be made in detail to examples of the present technology, examples of which are illustrated in the accompanying drawings. While the technology will be described in conjunction with various example(s), it will be understood that they are not intended to limit the present technology to these examples. On the contrary, the present technology is intended to cover alternatives, modifications and equivalents, which may be included within the spirit and scope of the various examples as defined by the appended claims.

Furthermore, in the following description of examples, numerous specific details are set forth in order to provide a thorough understanding of the present technology. However, the present technology may be practiced without these specific details. In other instances, methods, procedures, components, and circuits have not been described in detail as not to unnecessarily obscure aspects of the present examples.

Unless specifically stated otherwise as apparent from the following discussions, it is appreciated that throughout the present description of examples, discussions utilizing terms such as “receiving”, “generating”, “encrypting”, “creating”, “sending”, “authenticating”, “accessing”, “repeating”, or the like, refer to the actions and processes of a computer system, or similar electronic computing device. The computer system or similar electronic computing device manipulates and transforms data represented as physical (electronic) quantities within the computer system’s registers and memories into other data similarly represented as physical quantities within the computer system memories or registers or other such information storage, transmission, or display devices.

Overview of Discussion

As technology progresses, traditional single-format documents are slowly being replaced by composite ensembles: dynamically created from multiple differently formatted sources—individual files or fragments—to produce enriched, more appealing results. Disparate parts are combined together into a coherent document presentation using different visual cues: consistent styling, cross-document navigation bars and parts linking. Whilst physically bundled into a document serialization, individual parts retain their original formatting, which is beneficial for their subsequent reuse, re-purposing, remix or mash-up as well as for retaining the ability to access and manipulate individual parts using their native advanced tools. This has only become possible as a result of advanced layout techniques in combination with dramatically increased computing power: document presentation can now be compiled just-in-time and delivered to an awaiting user based on run-time parameters of a displaying device and the participant’s granted access, whilst taking into account various personal preferences.

An object as described herein refers to such a document or documents comprised of multiple parts and files including different formats for different parts or files. Such an object may be in an electronic format that is presented as single coherent document or file. An object may also refer to Hewlett-Packard Development Company’s publicly posted composite document (PPCD). A PPCD may be used to embed access control and enforce workflow order in cross-organizational workflows especially in absence of a trusted secure controller or service.

The object may be passed from one participant to another in a workflow. Each participant may have different responsibilities and different levels of access to the object: fine grained access to various parts of the object. Objects may not be enclosed into a single security domain and not owned by any single entity. These complicated and collaborative workflows are often associated with highly sensitive data: business intelligence, intellectual properties, competitive analysis, and confidential and/or private information. Without a trusted third party to manage and maintain such workflows, documents are simply shipped amongst dispersed participants by low security traditional e-mails, or mailed on CD/DVDs with the fine-grained access control required by the nature of the document often effected through manual data redaction. Subsequent document versions may then be assembled from the disparate individual replies. Sometimes individual document parts are shipped over secure channels (e.g. Hypertext Transfer Protocol Secure, or https) or even encrypted for protection in transition; however, this does not provide for the fine-grained access control.

One solution is to control access to an object through implementation of a Public Key Infrastructure (PKI), with the use of public and private keys. Prior to commencing a workflow, a pair of public and private keys must be issued for each workflow participant. Then, a document or object master must gain access to the corresponding trusted public key certificates for each workflow participant. Only then can the document workflow be generated and the document shipped along its workflow. Lack of knowledge of the public key of of the participants results in the inability to create a complete object workflow and initiate it.

Examples of the present technology employ Identity Based Encryption (IBE), which eliminates the requirement for prior possession of public and private keys by each workflow participant and the distribution of the workflow participants’ public keys to a document master (owner). In one example, the required public keys for each workflow participant are calculated based on user identities at workflow onset. The user identities which comprise user related information such as an email address, the user identity may or may not be publicly known. The generation of corresponding private keys can be delayed up until the workflow step, when the corresponding workflow participants require access to the document. Various examples also provide automatic workflow order enforcement and the ability to impose multiple document release dates.

When using IBE, the keys are calculated, thus providing a unique ability to delay the generation of private keys for a participant until a document reaches the participant. The other major advantage of IBE is that any participant's or user's uniquely identifiable information, including user related information (e.g. user's e-mail address), can be used as an identifier to derive this workflow participant's private key.

The following discussion will demonstrate various hardware, software, and firmware components that are used with and for objects with identity based encryption. Furthermore, the devices, computer systems and their methods may include some, all, or none of the hardware, software, and firmware components discussed below.

Embodiments of Objects with Identity Based Encryption

With reference now to FIG. 1, a block diagram of an example environment for an object with identity based encryption shown in accordance with examples of the present technology. Environment 100 comprises components that may or may not be used with different examples of the present technology and should not be construed to limit the present technology.

Object workflows or collaborative document workflows are often required to cross the boundaries of businesses, academic institutions, government organizations, and even countries and continents. Uncontained within the same secure domain and yet requiring enforced fine-grained access control, these cross-organizational composite document workflows pose a significant security challenge to the existing access control technologies. Environment 100 illustrates a solution for securing the object and providing access control.

In one example, object master 105 is an object or document master that may create the object or simply be tasked with distributing the object to participants in a workflow. In one example, object master 105 is a computer system associated with a user acting as the object or document master. It should be appreciated that the steps or actions described herein of a document master, a participant or a key generation center may be steps or actions taken by a computer system either automated or in response to commands from a user.

Object master 105 has the ability to communicate with key generation center 110 and participant 115. In one example, object master 105 receives public parameters 130 from key generation center 110 for object 120. In one example, object 120 is a publicly posted composite document. Public key 125 may be generated by object master 105 and used to create object 120. Public key 125 may be used to encrypt the corresponding part of object 120, i.e. to create object 120 before shipment.

Object master 105 uses the derived public key for each participant to encrypt the corresponding portion on the object 120 or PPCD, in particular object master 105 encrypts a participant's key-map and the participant's entry in the document entry-table accordingly. This is performed for each workflow participant. Object master 105 sends object 120 to participant 115. Participant 115 then communicates with key generation center 110 to be authenticated by sending key generation center 110 the public identifier of participant 115 and key generation center 110 derives private key 140.

After key generation center 110 authenticates participant 115, key generation center 110 derives and sends private key 140 to participant 115.

It should be appreciated that environment 100 may operate to provide public and private keys to a plurality of participants. For example, participant 115 may forward object 120 to a second participant such as participant 145. The participant 145 may then contact key generation center 110 for a private key unique to participant 145 where the private key is based on participant 145's identifier. Key generation center 110 may generate or derive private keys for a given participant during a predetermined time frame. Thus key generation center 110 may control access to object 120 to enforce a workflow order for object 120. Moreover, the workflow may employ more than one key generation center.

An object or publicly posted composite document (PPCD) can be comprised of: 1. the entry-table, 2. key-map entries and 3. content-part entries. The entry-table is a single entry point to a PPCD and its secure gate. The entry-table comprises a set of individual records, with at least one record provided for each workflow participant. Individual access records are assembled into the entry-table in a completely random order to eliminate any correlation with the access order required by the document workflow. A few fake records could be added to conceal the actual number of participants in sensitive workflows. This may be accomplished with randomly generated codes rather than encrypted codes or maybe encrypting a random data, to ensure that fake generated codes cannot be easily identified by various probabilistic and distribution tests. Without a corresponding record in the document entry-table, a user cannot access the document.

In prior solutions, the workflow participant's private decryption key is required to identify the corresponding record in the document's entry-table and extract the information from this record. Each individual record includes four separate fields: 1. the ciphertext of the participant's access symmetric key K, which is encrypted using the participant's public encryption key; 2. a plaintext "magic word" (e.g. any string of characters); 3. the ciphertext of the "magic word" encrypted using symmetric key K; 4. the ciphertext of the encrypted key-map entry name or Id in the document serialization, the key-map entry name or Id is encrypted using key K. This technique may be characterized as PKI. The present technology uses identity based encryption in place of PKI where public and private keys are calculated rather than generated randomly.

Using PKI techniques, to identify the participant's entry, it will be sufficient to decrypt the symmetric key K, then use K to decrypt the encrypted "magic word" and compare it with the plaintext "magic word". The recovered and plaintext "magic words" should match for the participant's correct record in the entry-table and for no other record in the entry-table. Once the participant's record in the entry-table is identified, the recovered symmetric key K is used to decrypt the participant's key-map entry name from the remainder of the record. Then, the actual content of the participant's key-map entry, also encrypted by key K, is loaded from the document serialization. The subset of keys for the document parts, corresponding to the granted access, is recovered by decrypting the participant's key-map entry. The present technology, using identity based encryption, replaces this symmetric key K.

The key-map entry for each participant, accessible by the corresponding participant only, can potentially be encrypted using the participant's public key. However, the additional symmetric key K is pre-generated during the PPCD creation for each participant and it is deployed to reduce the computational overhead of the potentially slow asymmetric cryptography as well as the potential attack of identifying individual records using known public keys of workflow participants. As noted above, the present technology replaces symmetric key K using identity based encryption. Labeling each key-map entry by user-related data or personal identifiable information (PII) could provide an alternative mechanism for identifying the participant's key-map entry. In one example, this is unacceptable due to the participant's privacy considerations. Such a technique may expose the workflow participant of a sensitive document or may reveal association of a particular participant with some sensitive workflow.

In one solution, workflow participants may attempt to decrypt each key-map entry in turn until the correct one—"decryptable" by a particular participant—is found. Whilst robust and privacy friendly, this approach is computationally expensive for large workflows with many different sensitivity parts: such workflows contain relatively large individual key-map entries and thus entries in the document entry-table.

In one example, differential access for each content-part in a composite document is enabled by 4 keys: encryption, decryption, signature and verification. Each content-part is first encrypted and then signed. Within the context of a composite document workflow a participant can be granted one of the following: Read Write (RW), Read Only (RO) or Verifiable Authenticity (VA) access. According to the PPCD protocol, the authenticity of each part is mandatorily verified on receiving a document. The corresponding part's verification key is provided for each part and each workflow participant at each workflow step. RO access is further provided by supplying the part's decryption key. To enable part modification RW, the remaining two keys (encryption and signature) are required. An item is decrypted, modified as needed, then encrypted and signed. The authenticity of such a modification is immediately validated by the subsequent workflow participant using the corresponding verification key, which is given for any access RW, RO or VA.

The subsets of keys for each participant per a workflow step or for an entire workflow are combined into individual key-map entries. Each of these is individually encrypted and signed and thus made accessible for a corresponding participant only and at a particular workflow step.

Some prior solutions have used Public Key Infrastructure (PKI) for publicly-posted composite documents. Limitations of PKI are that the workflow generation mechanism requires a prior knowledge of a valid public key certificate. This implies that prior to commencing a document workflow: 1. each workflow participant must be issued a pair of public and private keys and 2. the public key certificate must be communicated the workflow owner. The present technology provides solutions to overcome these limitations of PKI in deployment of PPCD technology. In other words, the present technology combines Identity Based Encryption techniques with PPCD technology to provide solutions for fine-grained access to objects in a workflow order.

In one example, the present technology generates just-in-time private keys using an identity based encryption scheme such that issues regarding expired or revoked certificates, typically used in a PKI solution, are overcome. Just-in-time key generation allows a workflow participant to be replaced by another user at the last moment, without causing a situation wherein the corresponding public key certificate is either not known for a workflow master. Using IBE, the participant's e-mail address can be used as the participant's public key and the generation of the participant's private keys can be delayed until the participant's access occurs.

Identity-based encryption (IBE) is a type of public cryptography, where public and private keys are calculated rather than being generated randomly. While IBE may have been employed in previous technology solutions, IBE solutions in the past were not used for objects comprising multiple parts with a plurality of files in different formats such as PPCDs to provide fine-grained access control to document parts according to a workflow order. The present technology amended PPCD generation and access protocols by taking advantage of IBE.

There are different types of identity-based encryption schemes: based on bilinear pairings on elliptic curves and the quadratic residuosity problem. In one example, the present technology employs the Boneh-Franklin scheme to generate keys shared between a document master and each workflow participant for each workflow step, for which the corresponding participant is granted one of the accesses: RW, RO or VA.

In one example, a unique user identifier (ID), including user related information, is used to calculate the participant's public key. In one example, the participant's e-mail address can be used as the participant's IBE identifier. It should be appreciated that that the IBE identifier is not limited to using an e-mail address. Other user related information regarding a participant may be used such as an address, a telephone number, a user identification, an avatar, etc. or a combination of user related information. It should be appreciated that the user related information may or may not be publicly known information.

The corresponding participant's private key is calculated from the participant's identity by a trusted third party, known as a Key Generation Center (KGC). A KGC corresponds to a Certificate Authority (CA) in the PKI scheme; however, the functionality is dramatically different. Similar to a CA, a KGC has its own pair of (strong) public and private keys, which are generated once. Then the public key is made publicly known, whilst the private key is kept as a major secret.

However, unlike a CA, each KGC has a third cryptographic object: IBE system (public) parameters, which are also made public. The KGC's IBE public parameters can, for example, specify different IBE algorithms or different key strengths. The KGC's public parameters are required to generate the participant's public key from the participant's or user's identity. As a result, different pairs of public and private keys will be generated for the same user identity by different KGCs.

A KGC can be run by a trusted third party; alternatively, a relatively large organization or enterprise can run their own KGC. A KGC needs to provide two services: 1. A Public Parameter Server (PPS) that provides a known location for secure distribution of IBE public parameters. 2. A Private-key Generator (PKG) that (a) accepts an IBE participant's request to generate the private key; (b) authenticates the participant; (c) computes the participant's IBE private key using participant's identity after successful authentication; and (d) returns the participant's IBE private key.

In one example, a workflow or object master is required to know the public keys for each participant in order to generate a workflow. To generate the participant's public key, the KGC's public parameters and its public key are required. The first KGC's service is used by an object master to obtain the KGC's public parameters. A PPCD master is capable of calculating the public keys for workflow participants after obtaining the KGC's public parameters. The same or different KGCs can be used for participants of the same workflow: the public cryptographic material for all used KGCs needs to be known by the object master. In the context of the PPCD, public keys for each participant are computed by the PPCD Authoring Tool.

The workflow participants in the IBE-PPCD do not need to have their private keys issued by the corresponding KGCs until a participant is required to access the document.

In one example, using a KGC's service could provide for time-insensitive and unordered workflows, the participants can retrieve their private keys at any time prior their work-flow-step. By using an extended user identifier that, for example, includes the earliest and latest private key release dates, it is possible to enforce different key release and expiry dates, thus providing for time sensitive workflows.

Using the IBE scheme, in one example, a shared secret is established between an object master and each workflow participant at the workflow level or at individual steps—depending on the workflow type and requirements. In multi-step workflows, where a participant might be required to access an object more than once with different accesses, a new shared secret could be established for every workflow steps or only some workflow steps. In one example, a participant can use the same shared secret to access the object more than once.

In a prior solution (PKI-based), such shared secrets may be deployed; however, they were randomly pre-generated by the object master at the object creation stage. Each secret was encrypted using the corresponding participant's public encryption key and delivered to the participant within the record in the document's entry-table. Each such secret was only recoverable by the corresponding workflow participant using the participant's private decryption key. The secret is subsequently used as a key to symmetric cryptography, e.g. Advanced Encryption Standard, to identify and decrypt the participant's key-map entry.

In one example of the present technology, such a unique shared secret is computed on both sides using IBE cryptography: at the onset of a workflow by the document master using the participants' IBE-public key, such as the participant's identifier or extended identifier, and at the point of access by each workflow participant using the participant's IBE-private key.

Using the same key derivation function (KDF), the shared key for symmetric cryptography is derived from this shared secret. Once the corresponding symmetric encryption key for each participant for each workflow step is computed, it is used to encrypt the participant's key-map entry by the document master and decrypt by the corresponding participant.

In one example, once the public key for each workflow participant is computed, the Authoring Tool is able to proceed with generating an object.

The present technology makes use of a pairing function e: $G_1 \times G_1 \rightarrow G_2$, where $G_1$ and $G_2$ are finite field groups of a large prime order q, and $G_1$ has a generator g. The pairing function e takes two elements from $G_1$ as input and outputs an element of $G_2$. The present technology also makes use of a symmetric encryption algorithm SE, a hash function H: $\{0, 1\}^* \rightarrow G_1$ and a key derivation function KDF: $G_3 \rightarrow \{0, 1\}^l$, where l is a bit length of a symmetric key used in SE.

In one example, a trusted third party, namely the Key Generation Center (KGC), generates a private key $x \in Z_q$ and the corresponding public key $(g, y=g^x) \in G_1^2$. In order to create a symmetric key which will be shared between an object master and a document workflow participant, say SSE (Shared Secret in Encryption), the object master, acting as an encryptor, first takes the document participant's identity, say ID, creates an ephemeral secret r, which is called the pseudo private key, and then computes $SSE=KDF(e(H(ID)^r, y))$. The object master also generates $z=g^r$, which is called the pseudo public key and will be made available to the document participant.

The same secret, the Shared Secret in Decryption (SSD) will be computed by the corresponding workflow participant during the participant's workflow step. Using a key derivation function KDF, a random key for AES encryption is further computed out of the SSE, i.e. $SSE=KDF(e(H(ID)^x, z))$, where $H(ID)^x$ is created by the KGC and used as the participant's private key. This private key can be generated at any time before the decryption process and does not have to be ready before the encryption process.

As such, it is no longer required to pre-generate the symmetric key K at the workflow onset and distribute it to each workflow participant within the corresponding entry in the document entry-table. These, in combination, result in the modified entry-table: 1. a plaintext "magic word" (e.g. any string of characters); 2. the ciphertext of the "magic word" encrypted using the symmetric key K, this key is now derived from the run-time computed SSE; 3. the ciphertext of the encrypted key-map entry name in the document serialization, the key-map entry name is encrypted using the same as above key K; 4. the participant's pseudo public key, $z=g^r$.

In order to access an object at some point in time, each workflow participant needs to contact the corresponding KGC and retrieve the participant's private key. The KGC authenticates the participant and generates the participant's private key. To compute the shared symmetric decryption key SSD, given the pseudo public key z, the document workflow participant has to obtain an asymmetric private key, which is based on the participant's identity ID and created by KGC, $k_{ID}=H(ID)^x \in G_1$. The value SSD is computed as $SSD=KDF(e(k_{ID}, z))$. Based on the bilinear property of the pairing function, the equation $e(H(ID)^x, y)=e(k_{ID}, z)$ holds; so SSD=SSE.

Then, using the IBE-pairing of the participant's private key and the pseudo public key, the participant, or a computer system associated with the participant, computes the Shared Secret in Decryption (SSD). Applying the same KDF to SSD, the participant derives the shared symmetric (Advanced Encryption Standard, or AES) key. Using the simplified entry-table design and the newly derived symmetric key: 1. The participant attempts to decrypt the encrypted "magic word" entry from every record in the entry-table and compares the result with the clear text "magic word" from the same record. 2. Once the decrypted and clear text values match, the participant, or the automatic software on participant's behalf, identifies the participant's record. 3. The participant decrypts the cipher-text of the encrypted key-map entry name, retrieves and decrypts this key-map entry—following the original object access.

Whilst any unique user information can be used as the participant's IBE identifier, the participant's e-mail address may be employed as it is always unique and in majority of cases an exclusive accessibility by the address owner can be safely assumed. In an object workflow, using the participant's e-mail address as the identifier provides an additional benefit over the PKI implementation: the number of required tokens per participant is reduced to one, as the same e-mail address is used for encrypting and e-mailing a document.

Moreover, an object master can encode some additional information into the participant's identifier, as in the following two examples: 1. Time-limiting: One or two time identifiers limiting the private key release timeframe: the participant's private keys may not be generated and given to the participant earlier and/or later than the corresponding time identifier. For some sensitive workflows these time identifiers can also be provided in some encrypted form. 2. Workflow-enforcing: A random identifier, nonce, that can be used to enforce the workflow order.

In one example, when a workflow participant contacts the corresponding KGC to retrieve the private key for the participant's extended identifier, the KGC can evaluate the identifier and decline the extraction if the time limits are not met. In one example, embedding data in the participant's identifier provides an additional control mechanism for an object workflow with authenticity guaranteed through the dependency of the private key on the workflow-participant.

In various examples, an object workflow can be subject to various time constraints. For example, voting or exam results may not be accessed before a certain date and time. A grant application workflow is another example of a time-sensitive object. With a few instances of objects running along their workflows in parallel, it could be imperative to ensure that all applicants receive their results simultaneously. However, some applications can be reviewed and decided upon faster than others, thus causing the final documents to reach some applicants earlier than others. To accommodate this requirement, the IBE identities of the applicants can be extended to include the object release date.

In one example, to enforce real time deadlines, release or expiration for a time-sensitive workflow, the participant's private key can be made available only within the certain time interval: not earlier than t1 nor later than t2 (t1<t2): t1<t<t2 by using user identity ID: ID||t1||t2 as participant's extended identifier. The lower limit t1 will ensure that the key are not released earlier that time t1, whilst the upper limit means the latest key release point by KGC. If the key expiration point is enforced for the strictly ordered workflow (with only one participant access at each workflow step), the mechanism should be provided to prevent workflow termination once some participant has failed to access the document.

t1 and t2 can vary for different workflow participants, and should be ordered according to the workflow logic: keys for early workflow participants should be released earlier. Also, a one-sided limitation can be enforced.

Apart from providing for time sensitive workflow needs, the delayed key release can provide extra safety, for private keys not being compromised (e.g. exposed or lost), if issued very early. In a similar manner, the key expiry date can prevent any subsequent misuse of the keys.

Using the workflow participant's key with different times-stamps provides a convenient mechanism to give different access rights for the same workflow participant at the different workflow steps in conjunction with Key Reset Mechanism. For more information regarding Key Reset Mechanism, refer to "Differential Access for Publicly-Posted Composite Documents with Multiple Workflow Participants," by H. Balinsky and S. Simske, in Proc. Of the $10^{th}$ ACM Symposium on Document, pages 115-124, Sep. 21-24, 2010.

Some sensitive workflows might require the real time to not be released within an object. Preventing such a release may prevent an attacker from knowing the object timeline or deliverables. If the object master decides to hide the real time, double encryption processes can be used. In one example, the real time is encrypted under an IBE key from ID or from ID||nonce, and the object (or the symmetric key for encrypting the object) is encrypted under an IBE key from ID||nonce. The participant is enforced to contact the KGC twice. In another example, the real time is encrypted under another key belonging to the KGC and the cipher text is sent to the KGC along with the key generation request. In this case the participant only needs to contact the KGC once. In yet another example, there is a time releasing KGC, which might not be the same as the object workflow related KGC and which regularly releases a time key, such as every morning, every Monday, every first day of month/year etc. This key is an IBE key with the identifier=time. The object master makes use of two keys, the participant's key and time key, to encrypt the object. The time key is shared by everybody in the system and is not a secret, but only available by a certain time.

In one example, an extended participant's identifier can also be used for enforcing the workflow order of access, by ensuring the access of all mandatory participants of a previous workflow step prior to allowing access to the participants of the subsequent step. This can be achieved by adding a random identifier, nonce N, to participant's IBE identifier, ID: ID||N. Whilst required by workflow participants in order to retrieve their corresponding private keys, these nonces are not provided openly within the document, but instead are hidden within each of the corresponding key-map entries of the previous step participants. Also, each key-map entry in an object is encrypted and can only be decrypted by the corresponding workflow participant.

Each workflow participant will receive the nonce, which is needed to complete the participant's IBE identifier only when the document is ready to access. For instance, the nonce $N_i$ for the $i^{th}$ participant is released by the $(i-1)^{th}$ participant, and the $(i-1)^{th}$ participant does not have to know who is the next participant, but simply puts the nonce into the object before releasing, shipping or e-mailing the document. The IBE key for the $i^{th}$ participant is created by using the participant's identifier and the nonce released by $(i-1)^{th}$ participant $ID_i||N_i$. This will prevent the out of turn access in an ordered workflow.

In one example, the participant's IBE identifier can be further extended by combining time and nonce. This ensures that the key will only be released when the object is released by the previous participant(s) and when the time is right—when both conditions have to be met.

In the IBE scheme used in an object workflow system, the relationship between participants and their KGCs is flexible. This means that each participant can have an individual KGC, and multiple participants can have either a single KGC (e.g. if they belong to the same organization) or multiple KGCs. The system can be further extended to accommodate access for some participants using public and private keys from PKI. The PPCD entry-table may contain two separate parts: one each for IBE and PKI participants. Or, it can be mixed with fake data added to the extra fields in otherwise shorter IBE records.

Operation

More generally, operations or methods are described for examples in accordance with the present technology, an object with identity based encryption. Such methods can be implemented using computer systems and networks.

Figure 2:
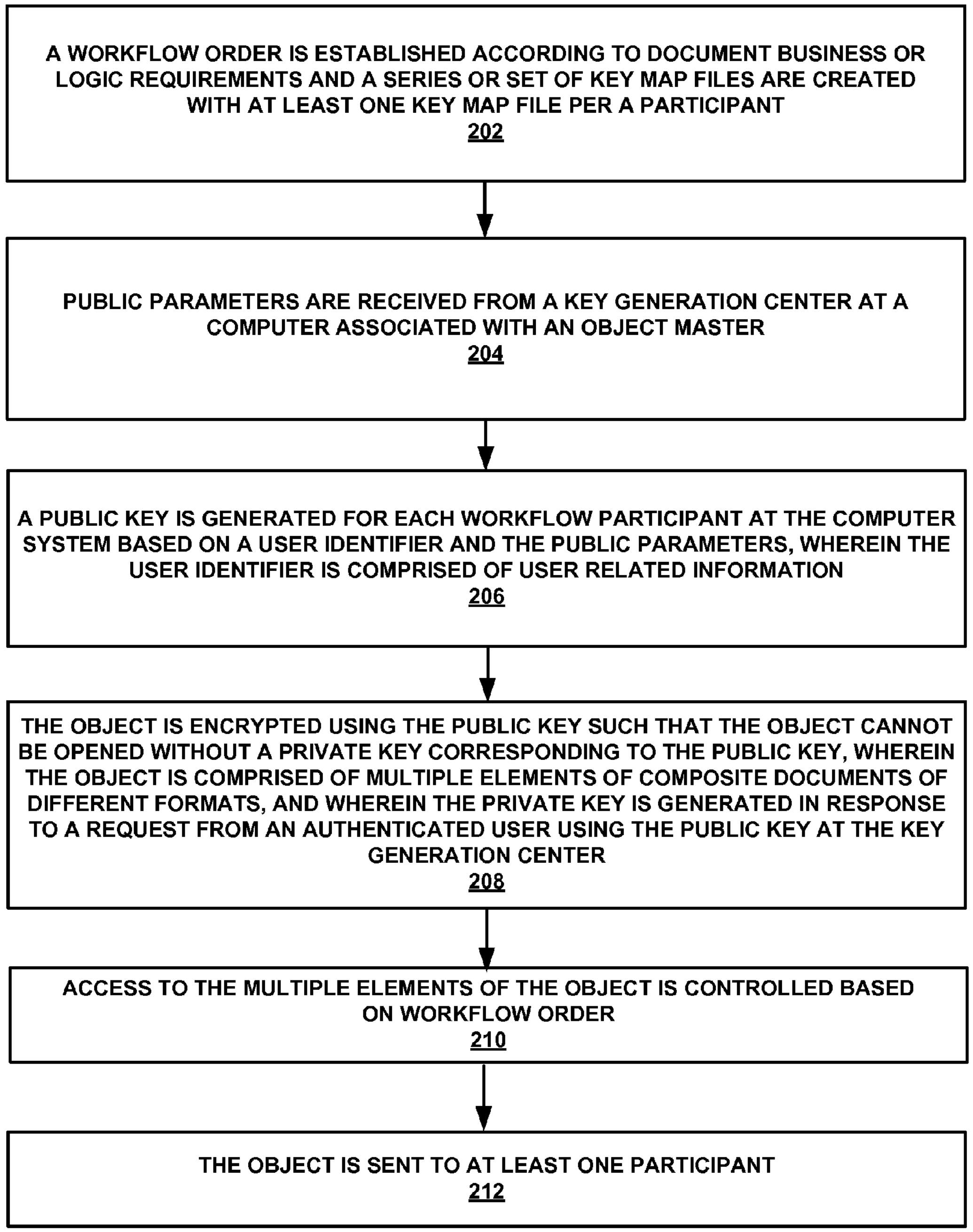
FIG. 2 illustrates a flowchart of an example method for encrypting an object in accordance with examples of the present technology.

FIG. 2 is a flowchart illustrating process 200 for encrypting an object, in accordance with one example of the present technology. In one example, process 200 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one example, process 200 is performed by environment 100 of FIG. 1.

In one example, process 200 is used to encrypt an object. It should be appreciated that the steps of process 200 may not need to be executed in the order they are listed in. Additionally, examples of the present technology do not require that all of the steps of process 200 be executed to encrypt an object.

At 202, a workflow order is created for the object. The workflow order may define the order in which workflow participants may access the object. The workflow order may be established according to document business or logic requirements. In one example, a set or series of key map files is also created for the workflow order, at least one key-map file or entry per participant. A participant could have more than one key map file generated if the participant is supposed to access the object at more than one workflow step with different access rights.

At 204, public parameters are received from a key generation center at a computer associated with an object master. In one example, key generation center 110 and object master 105 are employed to carry out this step.

At 206, a public key is generated at the computer system based on a user identifier and the public parameters, wherein the user identifier is comprised of user related information. In one example, user identifier 135 and public parameters 130 are employed to carry out this step. In one example, the user related information may be publicly know and may be an e-mail address, an address, a public identity, an avatar, a username, an extended user identifier, etc.

At 208, the object is partially encrypted using the public key such that the object cannot be opened without the a private key, wherein the object is a serialization comprised of multiple files of different formats, and wherein the private key is generated at the key generation center (KGC) following a successful authentication of a workflow participant by the KGC. In one example, private key 140 and user identifier 135 are employed. User identifier 135 may be a user identifier or an extended user identifier. In one example, the object is encrypted such that the private key for a given participant can only be accessed from a key generation center during a predetermined time frame. For example, an object master can establish a workflow order comprising a plurality of participants where each participant is assigned a time frame in which the participant is able to access the private key.

In one example, the object is a publicly posted composite document. In one example, the identity based encryption uses a Boneh-Franklin scheme or its trimmed version as described above to derive the same Shared Secret in Encryption (SSE) and Shared Secret in Decryption (SSD), which is subsequently used to encrypt and decrypt the participant's key-map file.

At 210, access to the multiple elements of the object is controlled based on workflow order.

At 212, the object is sent to at least one participant. For example, object 120 may be sent to participant 115. In one example, the participant completes a workflow step and then sends the object to a next participant in the workflow.

FIG. 3 is a flowchart illustrating process 300 for generating a private key for an encrypted object, in accordance with one example of the present technology. In one example, process 300 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one example, process 300 is performed by environment 100 of FIG. 1.

In one example, process 300 is used to generate a private key for an encrypted object. It should be appreciated that the steps of process 300 may not need to be executed in the order they are listed. Additionally, examples of the present technology do not require that all of the steps of process 300 be executed to generate a private key for an encrypted object.

At 302, a request is received from a participant for a private key at a computer system associated with a key generation center, wherein the private key is for accessing an object comprised of a plurality of files. In one example, the object is a publicly posted composite document.

At 304, the participant is authenticated based on a participant's unique identifier or extended identifier comprised of user related information that may or may not be publicly known information. In one example, the authentication step will only authenticate the participant during a predetermined time frame for access control to the object.

At 306, the private key is generated at the computer system based the user identifier and on public parameters previously generated by the key generation center, the private key corresponding to a public key. In one example, the private key is only generated after a creation of the object and the public key. In one example, the processes uses identity based encryption employing a Boneh-Franklin scheme to generate the public key and the private key.

At 308, the private key is sent to the participant.

Figure 4:
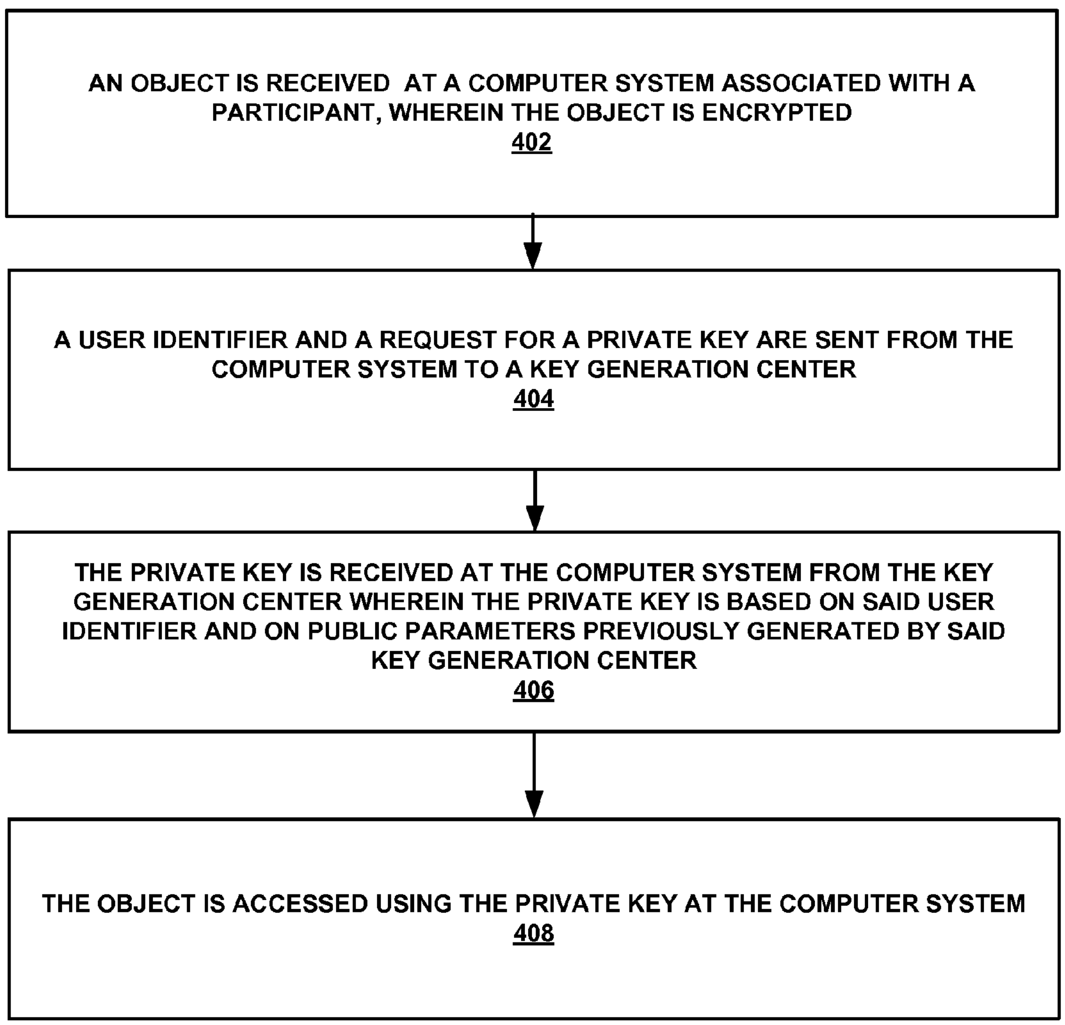
FIG. 4 illustrates a flowchart of an example method for accessing an encrypted object in accordance with examples of the present technology.

FIG. 4 is a flowchart illustrating process 400 for accessing an encrypted object, in accordance with one example of the present technology. In one example, process 400 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one example, process 400 is performed by environment 100 of FIG. 1.

In one example, process 400 is used to access an encrypted object. It should be appreciated that the steps of process 400 may not need to be executed in the order they are listed in. Additionally, examples of the present technology do not require that all of the steps of process 400 be executed to access an encrypted object.

At 402, an object is received at a computer system associated with a participant wherein the object is encrypted with identity based encryption. In one example, the object is associated with a workflow order and a key map for the object. The participant may receive the object from the object master or from another participant. In one example, the object is a publicly posted composite document.

At 404, a user identifier and a request for a private key are sent from the computer system to a key generation center. The user identifier could be an extended user identifier.

At 406, the private key is received at the computer system from the key generation center wherein the private key is based on said user identifier and on public parameters previously generated by said key generation center. In one example, the private key can only be generated and received during a predetermined time frame for access control purposes. In one example, the participant may have a choice of a plurality of key generation centers.

At 408, the object is accessed using the private key at the computer system. In one example, the processes uses identity based encryption employing a Boneh-Franklin scheme to generate the public key and the private key.

Example Computer System Environment

Portions of the present technology are composed of computer-readable and computer-executable instructions that reside, for example, in computer-usable media of a computer system. Described below is an example computer system or components that may be used for or in conjunction with aspects of the present technology.

It is appreciated that that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include signal generating and receiving device(s) coupled with a bus for enabling the system to interface with other electronic devices and computer systems. Signal generating and receiving device(s) of the present example may include wired serial adaptors, modems, and network adaptors, wireless modems, and wireless network adaptors, and other such communication technology. The signal generating and receiving device(s) may work in conjunction with communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A non-transitory computer-usable storage medium having instructions embodied therein that when executed cause a computer system to perform a method for encrypting an object, said method comprising:

creating a workflow order for said object;

receiving public parameters from a key generation center at a computer associated with an object master;

generating a public key, at said computer system, based on a user identifier and said public parameters, wherein said user identifier is comprised of user related information;

encrypting said object using said public key such that said object cannot be opened without a private key corresponding to said public key, wherein said object is a composite document comprising multiple elements of documents of different formats, and wherein said private key is generated in response to a request from an authenticated user using said user identifier at said key generation center; and controlling access to said multiple elements of said object based on said workflow order such that an order in which workflow participants may access the object is automatically enforced.

2. The non-transitory computer-usable storage medium of claim 1, wherein said creating said workflow order further comprises creating a set or series of key maps for said object, with at least one key-map per a workflow participant, and where a participant could have more than one key-map provided.

3. The non-transitory computer-usable storage medium of claim 1, further comprising:

sending said object to at least one participant.

4. The non-transitory computer-usablestorage medium of claim 1, wherein said at least one participant can only obtain said private key during a specified time frame.

5. The non-transitory computer-usable storage medium of claim 1, wherein said object is a publicly posted composite document.

6. The non-transitory computer-usable storage medium of claim 1, wherein said user identifier is selected from the group of user identifiers consisting of: an email address and an extended user identity.

7. The non-transitory computer-usable storage medium of claim 1, wherein a Boneh-Frankrn scheme is used to generate said public key and said private key.

8. A non-transitory computer-usable storage medium having instructions embodied therein that when executed cause a computer system to perform a method for generating a private key for an encrypted object, said method comprising:

receiving a request from a participant for a private key at a computer system associated with a key generation center, wherein said private key is for accessing an object comprised of a plurality of files and operates such that an order in which workflow participants may access said object is automatically enforced;

authenticating said participant based on a user identifier comprised of user related information received from said participant;

generating said private key at said computer system based on said user identifier and on public parameters previously generated by said key generation center, said private key corresponding to a public key; and sending said private key to said participant.

9. The non-transitory computer-usable storage medium of claim 8 wherein said object is a publicly posted composite document.

10. The non-transitory computer-usable storage medium of claim 8 wherein said authenticating further comprises only authenticating said participant during a predetermined time frame.

11. The non-transitory computer-u able storage medium of claim 8 wherein said generating said private key occurs after a creation of said object and said public key.

12. The non-transitory computer-usable storage medium of claim 8 wherein a Boneh-Franklin scheme is used to generate said public key and said private key.

13. A non-transitory computer-usable storage medium having instructions embodied therein that when executed cause a computer system to perform a method for accessing an encrypted object, said method comprising:

receiving an object at a computer system associated with a participant, wherein said object is encrypted with identity based encryption;

sending a user identifier and a request for a private key from said computer system to a key generation center;

receiving said private key at said computer system from said key generation center wherein said private key is based on said user identifier and on public parameters previously generated by said key generation center; and accessing said object using said private key at said computer system such that an order in which workflow participants may access said object is automatically enforced, 14. The non-transitory computer-usable storage medium of claim 13 wherein said receiving said private key can only occur during a predetermined time frame.

15. The non-transitory computer-usable storage medium of claim 13 wherein said user identifier is selected from the group of user identifiers consisting of: an email address and an extended user identity.

16. The non-transitory computer-usable storage medium of claim 13 wherein said object is associated with a workflow order and a key map for said object.

17. The non-transitory computer-usable storage medium of claim 13 wherein said object is received from said object master.

18. The non-transitory computer-usable storage medium of claim 13 wherein a Boneh-Franklin scheme is used to generate said private key.

19. The non-transitory computer-usable storage medium of claim 13 wherein said receiving said private key can occur using one of a plurality of key generation centers.

20. The non-transitory computer-usable storage medium of claim 13 wherein said object is a publicly posted composite document.

* * * * *

UNITED STATES PATENT AND TRADEMARK OFFICE

CERTIFICATE OF CORRECTION

PATENT NO. : 8,732,481 B2
APPLICATION NO. : 13/361850
DATED : May 20, 2014
INVENTOR(S) : Helen Y. Balinsky et al.

It is certified that error appears in the above-identified patent and that said Letters Patent is hereby corrected as shown below:

In the Claims:

In column 14, line 29, in Claim 4, delete “computer-usablestorage” and insert -- computer-usable storage --, therefor.

In column 14, line 41, in Claim 7, delete “Boneh-Frankrn” and insert -- Boneh-Franklin --, therefor.

In column 15, line 1, in Claim 11, delete “computer-u able” and insert -- computer-usable --, therefor.

In column 15, line 23, in Claim 13, delete “enforced,” and insert -- enforced. --, therefor.

Signed and Sealed this
Second Day of September, 2014

Michelle K. Lee

*Deputy Director of the United States Patent and Trademark Office*